(12) United States Patent
Mahmoudi et al.

(10) Patent No.: US 6,310,901 B1
(45) Date of Patent: *Oct. 30, 2001

(54) AUTOMATED AC FILAMENT UNIVERSAL LASER POWER CONTROLLER IN A GAS ION LASER SYSTEM AND METHOD

(75) Inventors: Mathew Mahmoudi, Sunnyvale; Warne M. Rintala, Cupertino, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/565,994

(22) Filed: May 6, 2000

Related U.S. Application Data

(63) Continuation-in-part of application No. 09/089,568, filed on Jun. 3, 1998, now Pat. No. 6,104,737.

(51) Int. Cl.[7] ................. H01S 3/00; H02J 1/02; H02M 1/12; H02M 1/10; H02M 5/00
(52) U.S. Cl. ................. 372/38.02; 372/38.04; 372/38.07; 363/39; 363/44; 363/142; 363/143; 363/164
(58) Field of Search .................. 372/38.02, 38.04, 372/38.07; 363/142, 143, 39, 44, 164

(56) References Cited

U.S. PATENT DOCUMENTS

| | | | |
|---|---|---|---|
| 4,079,265 | * | 3/1978 | Woodburn ..................... 307/108 |
| 4,665,323 | * | 5/1987 | Russell et al. ................. 307/75 |
| 5,601,741 | * | 2/1997 | Thommes ................. 219/130.21 |
| 5,654,884 | * | 8/1997 | Mohan ........................... 363/126 |
| 6,104,737 | * | 8/2000 | Mahmoudi ..................... 372/38 |

OTHER PUBLICATIONS

Lloyd H. Dixon, Jr., High Power Factor Preregulators for Off–Line Power Supplies, Unitrode Power Supply Design Seminar Manual, SEM–700, Copyright 1990.

Lloyd Dixon, High Power Factor Switching Preregulator Design Optimization, Unitrode Power Supply Design Seminar Manual, SEM–700, Copyright 1990.

* cited by examiner

Primary Examiner—Frank G. Font
Assistant Examiner—Armando Rodriguez
(74) Attorney, Agent, or Firm—Michael Pritzkau

(57) ABSTRACT

A power supply is provided for use in a laser system including a gas ion laser tube which requires a filament voltage provided by an output section of the power supply. The filament voltage provided should not exceed a maximum AC filament voltage specified for the laser tube. The power supply is configured to receive AC utility power using one of at least first and second AC utility power sources having different first and second intended fixed magnitudes and which utility sources vary in amplitude from the intended fixed magnitudes over corresponding first and second source voltage ranges. The power supply is configured to include a power control arrangement which automatically controls the output section to generate an auto-ranging AC filament voltage from either of the first and second utility sources to be supplied as the filament voltage. For each of the first and second AC utility power sources, the auto-ranging AC filament voltage is limited to a regulated range extending below, but not exceeding the maximum AC filament voltage when the first and second voltages are within the first and second source voltage ranges, irrespective of which of the first or second AC utility power sources to which the power supply is connected. In one feature, the filament voltage is provided to the laser tube in a way which manages an operating lifetime of the laser tube in view of known lifetime data. In another feature, minimum air cooling requirements of a laser tube are met when one or more auto-ranging AC fan voltages are generated by the auto-ranging power supply over the first and second AC utility source voltage ranges.

33 Claims, 8 Drawing Sheets

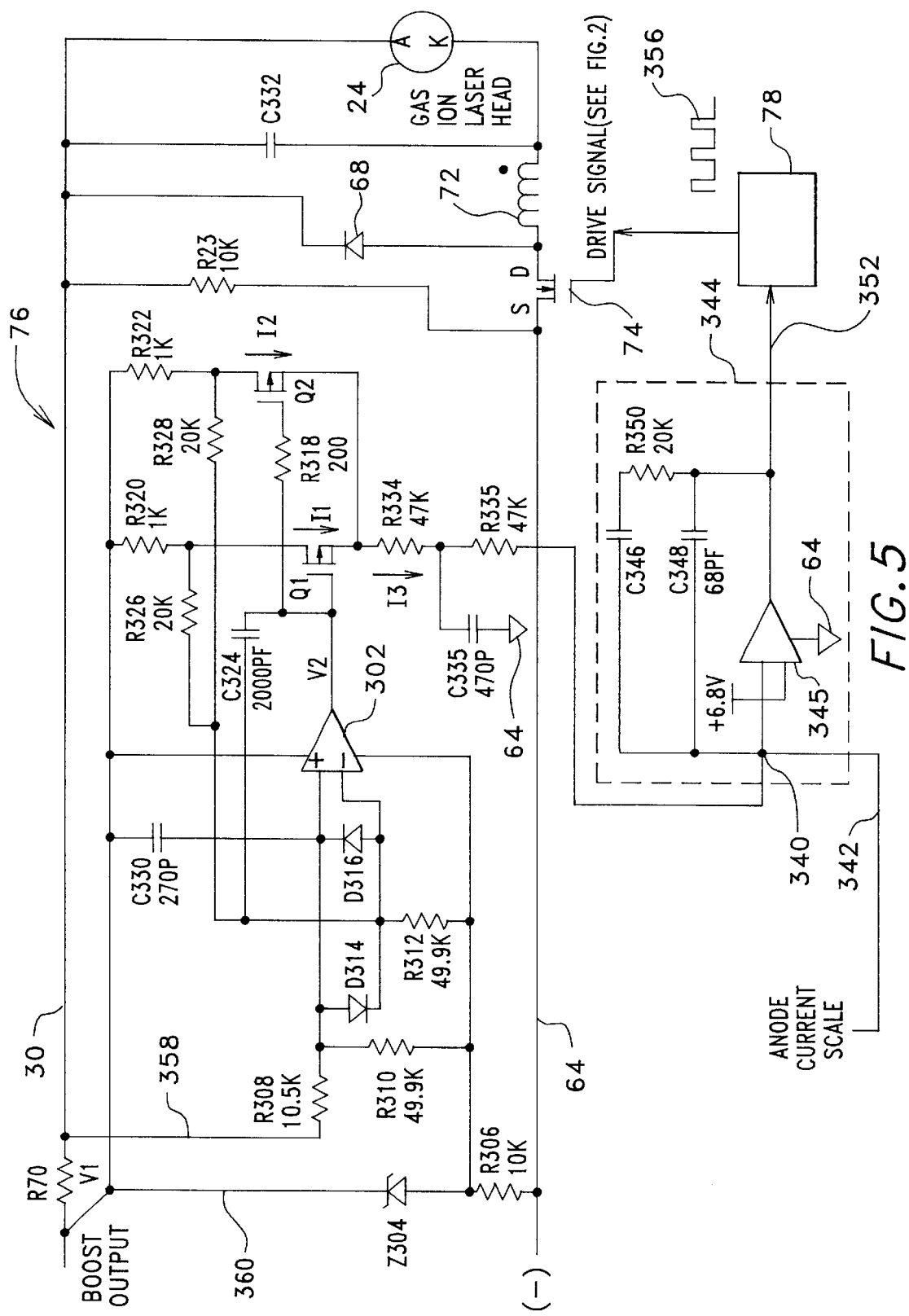

AUTOMATED AC FILAMENT UNIVERSAL LASER POWER CONTROLLER IN A GAS ION LASER SYSTEM AND METHOD

CROSS REFERENCE TO RELATED APPLICATION

The present application is a continuation-in-part of U.S. patent application Ser. No. 09/089,568, now U.S. Pat. No. 6,104,737 issued Aug. 15, 2000, entitled "UNIVERSAL LASER POWER CONTROLLER IN A GAS ION LASER SYSTEM AND METHOD", filed Jun. 3, 1998, which is incorporated herein by this reference.

BACKGROUND OF THE INVENTION

The present invention relates generally to power supplies for use in gas ion laser systems and more particularly to an overall laser system in which a universal laser power controller drives a gas ion laser tube. Specific apparatus and methods are introduced with regard to tube start-up, current sensing for feedback purposes and switching regulation.

A typical gas ion laser system includes a power supply which drives a gas ion laser tube. It should be appreciated that a wide variety of gas ion laser tubes are available depending upon the intended application. Differences between available tubes include cathode voltages ranging from 70 volts DC to 200 volts DC, output power and output wavelength. At the same time, laser tubes having different cathode voltages may require other drive voltages which are identical. For example, most gas ion tubes require a 3.3 volt AC filament voltage.

In the prior art, based on the wide range of available gas ion laser tubes, power supplies have typically been provided in configurations for driving one, specific tube out of the array of available laser tubes using one particular AC input voltage. In view of this approach, manufacturers have been burdened with producing an array of power supplies which is at least as broad as the array of available gas ion laser tubes based solely on tube drive requirements. The number of different power supplies is further proliferated by public utility systems which provide either 110 volts AC or 220 volts AC input. For all of these reasons, distributors and end users of laser systems are likewise burdened by costs associated with the need for a different power supply each time a laser tube with a different drive requirement is used or a different input AC voltage is provided. Thus, as will be described in detail below, an approach is needed for reducing the number of different power supplies required for available laser tubes. Preferably, the approach should also address drive requirements of tubes to be developed in the future.

Other concerns arise with regard to prior art gas ion laser systems. One concern relates to regulation of power output of the laser tube. Regulation is critical not only for controlling the output light level of the laser, but also in regard to maximization of the lifetime of a laser tube. For example, overdriving a tube by only 10% will result in a subsequent shortening of the tube's lifetime by approximately 25%. Prior art regulation arrangements normally utilize a shunt resistor located in the cathode lead of the laser tube. Unfortunately, as will be further described, this arrangement is disadvantageous since filament current provided to the laser tube also circulates in the cathode lead resulting in variations in the voltage sensed by the shunt resistor which variations are not necessarily related to the anode to cathode current passing through the tube. Prior art regulation schemes are also disadvantageous with regard to the typical arrangement of the switching device used in the buck power stage of the power supply. Typically, switching is accomplished using a MOSFET which is located in the "high" side lead (i.e., providing anode current) of the power supply. Unfortunately, producing a precise drive signal for the gate of the MOSFET is quite difficult since the drive signal itself must essentially float on a large DC bias. The DC bias varies from the primary ground to the anode voltage of the laser tube and has a significant impact on MOSFET switching.

Another concern arises with regard to new and rigorous standards (as of the date of this writing) imposed on operation of electrical devices. More specifically, a European standard which is referred to as IEC imposes a restriction on total harmonic distortion of no more than 3% induced into an AC supply line. In this regard, gas ion laser systems are prone to producing such harmonics due to substantial input power requirements. The need for high input power levels is due to the relatively low efficiency of laser systems in converting AC input power to laser light output power. Hence, an alternating current input providing power to the laser system is generally loaded to near its maximum current capabilities. In the instance of such high current loading, prior art laser systems generally introduce significant harmonics which violate the IEC standard. Violation can occur at startup due to inrush currents, and may continue during steady state operation of the laser.

Still another concern relates to line voltage available to power the laser system. In particular, variations in the input voltage provided by a utility may translate into variations in the filament voltage which is problematic if the filament of the laser tube is overdriven since the lifetime of the laser tube is shortened.

The present invention provides a highly advantageous power controller within an overall laser system and an associated method. The power controller is readily configurable in a way which has not been seen heretofore in laser applications for use with different AC input voltages in driving a wide range of gas ion laser tubes having different drive requirements. The overall design features conformance with the aforementioned IEC standard, a highly advantageous startup arrangement and a highly advantageous feedback arrangement, all of which cooperatively ensure consistent startup and stable operation. An auto-ranging AC filament generation arrangement is also introduced.

SUMMARY OF THE INVENTION

As will be described in more detail hereinafter, a multi-mode/universal laser power controller is disclosed for use in an overall laser system. An associated method is also disclosed. The controller may drive one of at least two different laser tubes which require different particular sets of drive voltages. The power controller includes a first arrangement for selecting first and second modes of operation of the power controller depending on and corresponding to which specific one of the two different laser tubes the power controller is intended to drive and a power conversion arrangement which is designed to operate from one of at least two different AC input voltages representing most utilities around the world. The conversion arrangement is responsive to the particular mode selected by the first arrangement such that the power conversion arrangement uses a selected one of the input voltages to produce the particular set of drive voltages to be used to drive the specifically selected laser tube.

In one aspect of the present invention, a method is disclosed for starting a gas ion laser tube. The tube is provided as part of a system including a power supply arrangement configured for operating the laser tube, the power supply arrangement itself includes (i) a boost arrangement configured for generating a boost voltage, the boost arrangement requires a predetermined period of time after startup to build up the boost voltage, (ii) a buck arrangement configured for using the boost voltage to generate and apply an anode voltage to the laser tube to produce an anode current, and (iii) means for generating a tube startup voltage and for applying the startup voltage to the laser tube. The method includes the steps of starting the boost arrangement so as to begin to build up the boost voltage. Concurrent with, after or prior to starting the boost arrangement, the startup voltage is applied to the laser tube. A wait state is then entered until such time that the boost voltage builds up to a predetermined, stable value. Upon the boost voltage reaching its predetermined value and with the startup voltage applied to the laser tube, startup of the buck arrangement is initiated such that the buck arrangement begins to generate anode voltage which is applied to the anode of the laser tube thereby producing a steady state anode current. After the anode current reaches a threshold value, the startup voltage is removed.

In another aspect of the present invention, the power controller provides power to the laser tube via a cathode lead and an anode lead which are connected to the cathode and anode terminals, respectively, of the laser tube. Filament power is provided to the laser tube in a way that causes filament current to flow in the cathode lead. The power controller also includes means for controlling the level of anode current provided to the laser tube in response to a control signal. A highly advantageous arrangement is disclosed for providing the control signal. The arrangement includes first means subjected to the anode current present in the anode lead for producing a sense voltage which is directly proportional to the anode current and which is not subjected to filament current which circulates in the cathode lead. Second means is provided for using the sense voltage to generate the control signal.

In still another aspect of the present invention, the control signal for regulating the laser tube anode current is generated by sensing anode current flowing in the anode lead as a detected voltage which is essentially floating with respect to a primary ground. A feedback current is then produced in direct proportion to the detected voltage and used in a way which produces a feedback voltage that is referenced to the primary ground. The control signal is then produced using the feedback voltage.

In accordance with yet another aspect of the present invention, switching means is provided including at least first and second terminals and means for selectively providing (i) a closed state in which the first and second terminals are substantially shorted together and (ii) an open state in which a substantial resistance is presented between the first and second terminals. The improvement comprises electrically connecting the first terminal of the switching means directly to the primary ground and connecting its second terminal such that current flows from the cathode lead of the laser tube to the second terminal and, thereafter, through the switching means when the switching means is in its closed position. In one feature, this improvement may be utilized in a highly advantageous combination with aforedescribed aspects in which the sense voltage is detected in the anode lead.

In an additional aspect of the present invention, a power supply is provided for use in a laser system including a gas ion laser tube which requires a filament voltage provided by an output section of the power supply. The filament voltage provided should not exceed a maximum AC filament voltage specified for the laser tube. The power supply is configured to receive AC utility power using one of at least first and second AC utility power sources having different first and second intended fixed magnitudes and which utility sources vary in amplitude from the intended fixed magnitudes over corresponding first and second source voltage ranges. The power supply is configured to include a power control arrangement which automatically controls the output section to generate an auto ranging AC filament voltage from either of the first and second utility sources to be supplied as the filament voltage such that, for each of the first and second AC utility power sources, the auto-ranging AC filament voltage is limited to a regulated range extending below, but not exceeding the maximum AC filament voltage when the first and second voltages are within the first and second source voltage ranges, irrespective of which of the first or second AC utility power sources to which the power supply is connected. In one feature, the filament voltage is provided to the laser tube in a way which manages an operating lifetime of the laser tube in view of known lifetime data. In another feature, minimum air cooling requirements of a laser tube are met when one or more auto-ranging AC fan voltages are generated by the auto-ranging power supply of the present invention over the first and second AC utility source voltage ranges.

BRIEF DESCRIPTION OF THE DRAWINGS

The present invention may be understood by reference to the following detailed description taken in conjunction with the drawings briefly described below.

FIG. 5 is a schematic diagram of an anode current sense module for use in detecting anode current flowing in the anode lead of a laser tube in accordance with the teachings of the present invention.

DETAILED DESCRIPTION OF THE INVENTION

Figure 1:
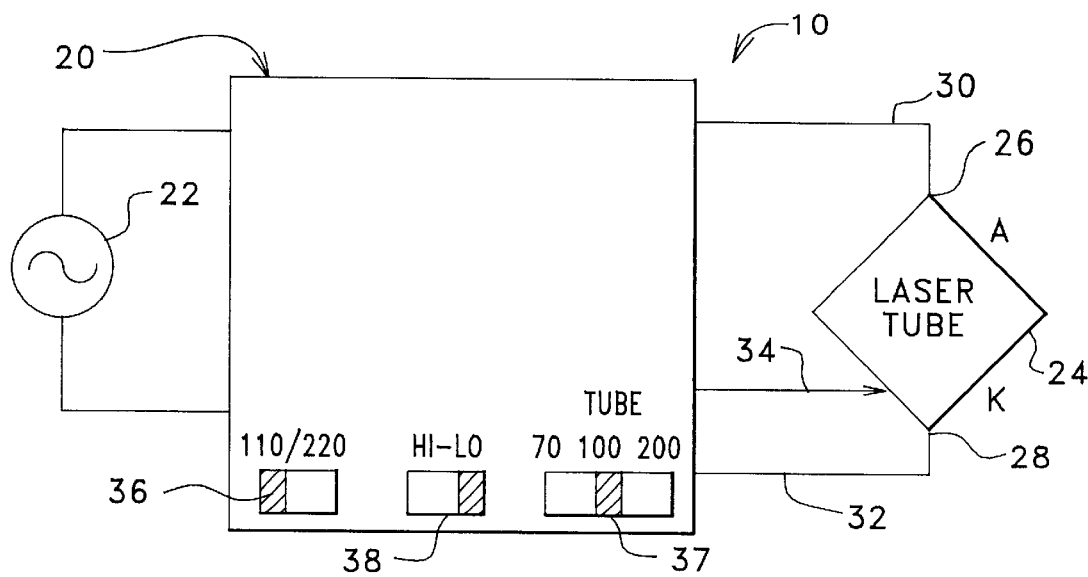
FIG. 1 is a diagrammatic representation of a gas ion laser system including a highly advantageous universal laser power controller manufactured in accordance with the present invention.

Attention is immediately directed to FIG. 1, which illustrates a gas ion laser system 10. System 10 includes a universal power supply/controller manufactured in accordance with the present invention and generally indicated by the reference numeral 20. Supply 20 receives AC input power from a standard utility service 22 which typically provides an AC voltage of approximately either 110 or 220 volts AC depending upon the particular location in the world of the utility service. A gas ion laser tube 24 includes an anode terminal 26 and a cathode terminal 28. Supply 20 is electrically connected to tube 24 using an anode lead 30 and a cathode lead 32. As described above, it should be appreciated that gas ion laser tubes are designed for operation using a variety of different anode to cathode bias voltages presently ranging from 70 volts DC to 200 volts DC. Typical values within this range include 70, 100 and 200 VDC. However, the present invention is equally applicable for use with any other voltage either within or outside of the indicated range. Moreover, supply 20 is readily adaptable to a wide range of gas ion laser applications using, for example, Argon, Krypton and various mixed gas laser tubes.

Continuing to refer to FIG. 1, universal supply 20 also provides voltages other than the anode to cathode voltage to tube 24 as generally indicated by a line 34. These other voltages will be described in further detail at appropriate points hereinafter, but typically include filament voltage, startup voltage, thermal interlock voltage and fan voltage. As mentioned, anode to cathode voltage may change from one tube to the next. On the other hand, certain other voltages such as, for example, filament voltage (typically 3.3 VAC) and fan voltage are generally identical across a wide array of tubes having different anode to cathode voltages. Thus, for any specific laser tube, a particular set of drive voltages is required to facilitate the operation of the tube with some voltages changing from one type of tube to the next and other voltages remaining unchanged.

In accordance with the present invention, universal supply 20 includes a number of highly advantageous features which facilitate the use of different input voltages and for purposes of accommodating laser tubes which require different sets of drive voltages. For example, in the depicted embodiment of supply 20 a user selectable input voltage selection switch 36 and a user selectable anode to cathode voltage switch 37 are provided. The latter includes individual settings for 70, 100 and 200 VDC laser tubes. Input voltage selection switch 36 includes settings for 110 or 220 VAC inputs. It should be appreciated that the illustrated configuration of the input voltage selection and anode to cathode voltage selection switches represents only one of a number of embodiments which are possible. For example, the anode to cathode voltage switches could be provided using jumper settings on a printed circuit board.

Still referring to FIG. 1, another feature provided by supply 20 is a Hi-Lo switch which is denoted by reference number 38. The purpose of Hi-Lo switch 38 relates to the general nature of utility supply voltages. Specifically, utilities attempt to provide "target" values of AC voltages to consumers of electrical power. However, the target value is rarely achieved. For example, an intended 117 VAC target value may appear anywhere in the range from 90 VAC to 140 VAC. Hi-Lo switch 38 is provided for adjusting various transformer dependent voltages in view of the deviation of the AC supply voltage from its intended value. For example, if the actual voltage is in the range from 109 to 132 VAC, the Hi-Lo switch should be set to its Hi position while, if the actual voltage is in the 90 to 108 VAC range, the Hi-Lo switch should be set to its Lo position. Similarly, for a 220 VAC utility, if the actual voltage is in the range from 234 to 264 VAC, the Hi-Lo switch should be set to its Hi position while, if the actual voltage is in the 180 to 229 VAC range, the Hi-Lo switch should be set to its Lo position. Voltages which are affected by the Hi-Lo switch, in this instance, include the 3.3 VAC filament voltage, a fan voltage and a center tapped winding (not shown) which is used for powering electronic components internal to supply 20. The specific manner in which each of the aforementioned features are implemented will be described at appropriate points in the discussions below.

Figure 2:
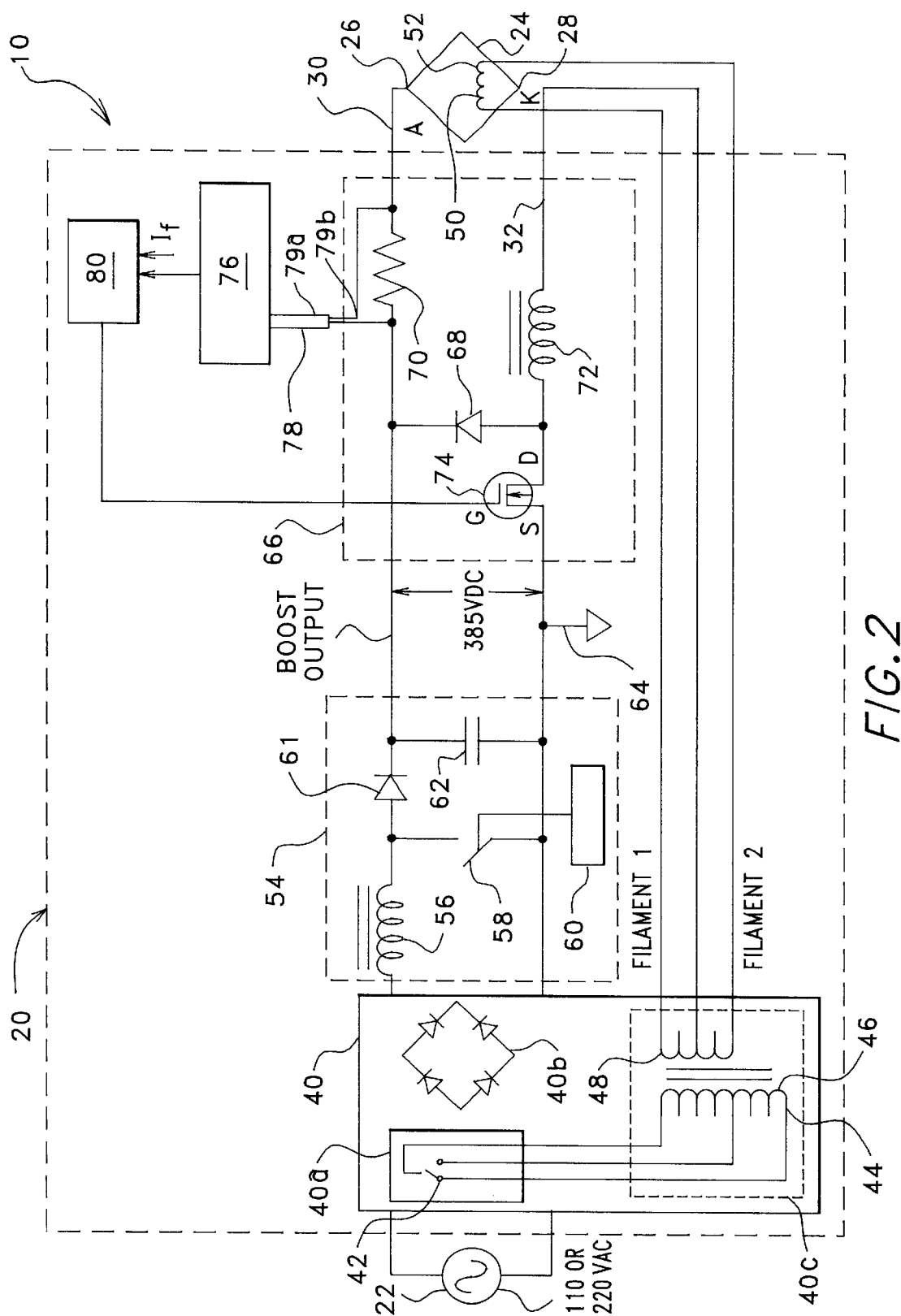
FIG. 2 is diagrammatic representation of the power controller of the present invention shown here to illustrate certain highly advantageous design features which are incorporated in the overall design.

Turning now to FIG. 2 in conjunction with FIG. 1, specific details regarding the internal componentry of supply 20 will now be provided. It is noted that like reference numbers have been applied to like components wherever possible throughout the various figures. AC input 22 is provided to a universal input power arrangement 40 which includes a voltage switching arrangement 40a, a full wave bridge rectifier 40b and a transformer arrangement 40c. Transformer arrangement 40c and switching arrangement 40a are only partially illustrated for purposes of clarity and will be described in more detail below. For the moment, however, it is noted that the switching arrangement includes a Hi-Lo switch 42 which is connected to a winding 44 which forms part of transformer arrangement 40c. Hi-Lo switch 42 is connected across a predetermined number 46 of transformer primary windings such that windings 46 may be bypassed, depending upon the setting of the switch. The transformer includes a center tapped secondary winding (among other secondary windings not shown) which provides 3.3 VAC filament voltages to first and second filaments 50 and 52 respectively of laser tube 24. It should be observed that center tap 54 of the filament transformer winding serves as cathode lead 28 for the laser tube. The importance of this observation will become apparent in a subsequent discussion relating to regulation of the output of the laser tube. The illustrated position of Hi-Lo switch 42 corresponds to its Hi setting while its opposite position corresponds to its Lo setting. By setting the switch in the Hi position, the primary to secondary turns ratio of the filament transformer is effectively reduced thereby lowering the voltage induced on secondary 48. In instances of high AC input voltages such as, for example, 130–140 VAC, the Hi-Lo switch feature is particularly advantageous. Specifically, the lifetime of filaments 50 and 52 of laser tube 24 is directly proportional to the voltage placed on the filaments. Thus, by using the Hi-Lo switch to lower the filament voltages to their intended values, the expected lifetime of the laser tube is preserved along with the AC fan. It should be appreciated that any secondary winding provided in transformer 44 will be similarly affected by Hi/Lo switch 40. The present example represents only one possible configuration for providing Hi-Lo switch 42.

Still referring to FIGS. 1 and 2, rectifier 40b provides raw, unfiltered DC power to a boost section 54 which includes a known configuration having an inductor 56, an electronic switch 58 (typically a MOSFET), control means 60 which drives switch 58, a switching diode 61 and one or more filter capacitors 62. In this instance, boost section provides approximately 385 VDC at a boost output as indicated in FIG. 2 which is referenced to a primary ground 64 and provided to a buck regulator section 66. Boost section 54 is useful in shaping the input current waveform such that a very high power factor (approximately 0.99) is presented to AC input source 22.

While buck section 66 has been referred to using a name seen commonly in the prior art, it should be appreciated that a highly advantageous configuration has been provided in the buck section of the present invention which is specifically adapted in several ways for the purpose of driving a laser tube. Buck section 66 includes a fast switching diode 68, a shunt resistor 70 located in anode lead 30 extending to laser tube 24 and an inductor 72 connected with the cathode of laser tube 24 via cathode lead 32. It should be appreciated that, in typical prior art laser power supplies, inductor 72 is normally positioned in anode lead 30. More significantly, shunt resistor 70 is normally connected in cathode lead 32. As previously mentioned, filament current circulates in cathode lead 32 since the latter comprises the current return path to filament transformer 44. Therefore, in the prior art configuration, the cathode lead located shunt resistor is normally subjected to inaccuracies caused by the filament currents. By locating the shunt resistor in anode lead 30, the present invention eliminates the filament current inaccuracy problem. Irrespective of the location of the shunt resistor, it should be appreciated that the sensed voltage is quite small and, in the configuration of the present invention, is essentially floating near 385 VDC. As will be discussed at an appropriate point, the present invention provides highly effective circuitry and an associated method for referencing a feedback signal to primary ground 64 by sensing shunt resistor voltage in a highly accurate manner so as to avoid introducing significant noise contamination at the contemplated signal levels.

Continuing with a description of the circuitry of FIG. 2, buck section 66 also includes an electronic switch which typically comprises a MOSFET 74 or any suitable switching means either currently available or to be developed. The MOSFET defines, between its source "S" and drain "D" terminals, the current return path from the cathode of laser tube 24 to primary ground 64. In this regard, the configuration of supply 20 is particularly advantageous due to the fact that the source, S, of the MOSFET is directly connected to primary ground 64. One of skill in the art will appreciate that this feature simplifies the complexities required in producing a drive signal for the MOSFET gate terminal, "G", to a great extent, as compared with the prior art configuration which necessitated producing a gate drive signal that essentially "floated" between zero and 385 VDC. In and by itself, this feature is capable of significantly enhancing accuracy in regulation of power provided to laser tube 24. A ground referenced MOSFET gate signal is generated using an anode current sense amplifier 76 which is coupled to shunt resistor 70 by a coaxial cable 78. The relatively small voltage, on the order of 500 mV, sensed across the shunt resistor is measured by anode current amplifier 76. The latter produces a feedback signal in the form of a feedback current, $I_f$. A control section 80 then uses the feedback current to produce the gate drive signal (essentially, a width modulated pulse train at approximately 100 kHz) provided to MOSFET 74. It is noted that the different anode to cathode voltages i.e., 70–200 VDC, are provided by pulse width modulation of the gate drive of MOSFET 74. Since certain aspects of the circuitry which comprises anode current sense amplifier 76 and control circuit 80 are considered to be highly advantageous, further descriptions will be provided below. For the moment, however, it should be mentioned that one significant factor in reducing noise contamination of feedback current $I_f$ resides in the use of coaxial cable 78. As a result of the required location of shunt resistor 70 (in anode lead 30) within the section of the power supply that is subjected to noise due to switching of relatively high currents, noise contamination of the feedback signal should be guarded against. It is also noted that anode current sense amplifier 76 is typically surrounded by a relatively quiet noise environment, as compared with the location of the shunt resistor. However, transferring the feedback signal out of the proximity of the noisy environment of the shunt resistor to anode current sense amplifier 76, while avoiding induction of noise on the feedback signal, can be difficult. Applicant has discovered that the use of coaxial cable 78 is remarkably effective in accomplishing this task. To this end, cable 78 includes a shield 79a surrounding a twisted pair of wires 79b. The shield is connected (not shown) at each end with primary ground 64 and the twisted pair carries the sensed voltage.

With continuing reference to FIG. 2, it is important to understand that the "buck" configuration introduced in accordance with the teachings herein is essentially the inverse of the configuration which is normally seen in the prior art. Specifically, these differences include: (1) locating shunt resistor 70 in the anode lead as opposed to the cathode lead so as to provide immunity from circulating filament currents which are present in the cathode circuit and (2) referencing the switch drive MOSFET 74 directly to primary ground rather than locating the MOSFET in the positive side of the 385 VDC line so as to provide for accurate switching using a gate drive signal which is itself referenced to ground, obviating the prior art need for providing a drive signal floating between zero and 300 plus volts above ground. Thus, in the ground-referenced gate drive configuration of the present invention, the gate drive signal (and, of course, the duty cycle of MOSFET 74) is not itself subject to variations in the 385 VDC provided by boost section 54 or to noise on the 385 VDC supply lines. Applicant considers each of these configuration features to be highly advantageous either alone or in combination. It should be appreciated that FIG. 2 represents a current feedback mode implementation. However, as will be seen, supply 20 also provides a light feedback mode.

Figure 3:
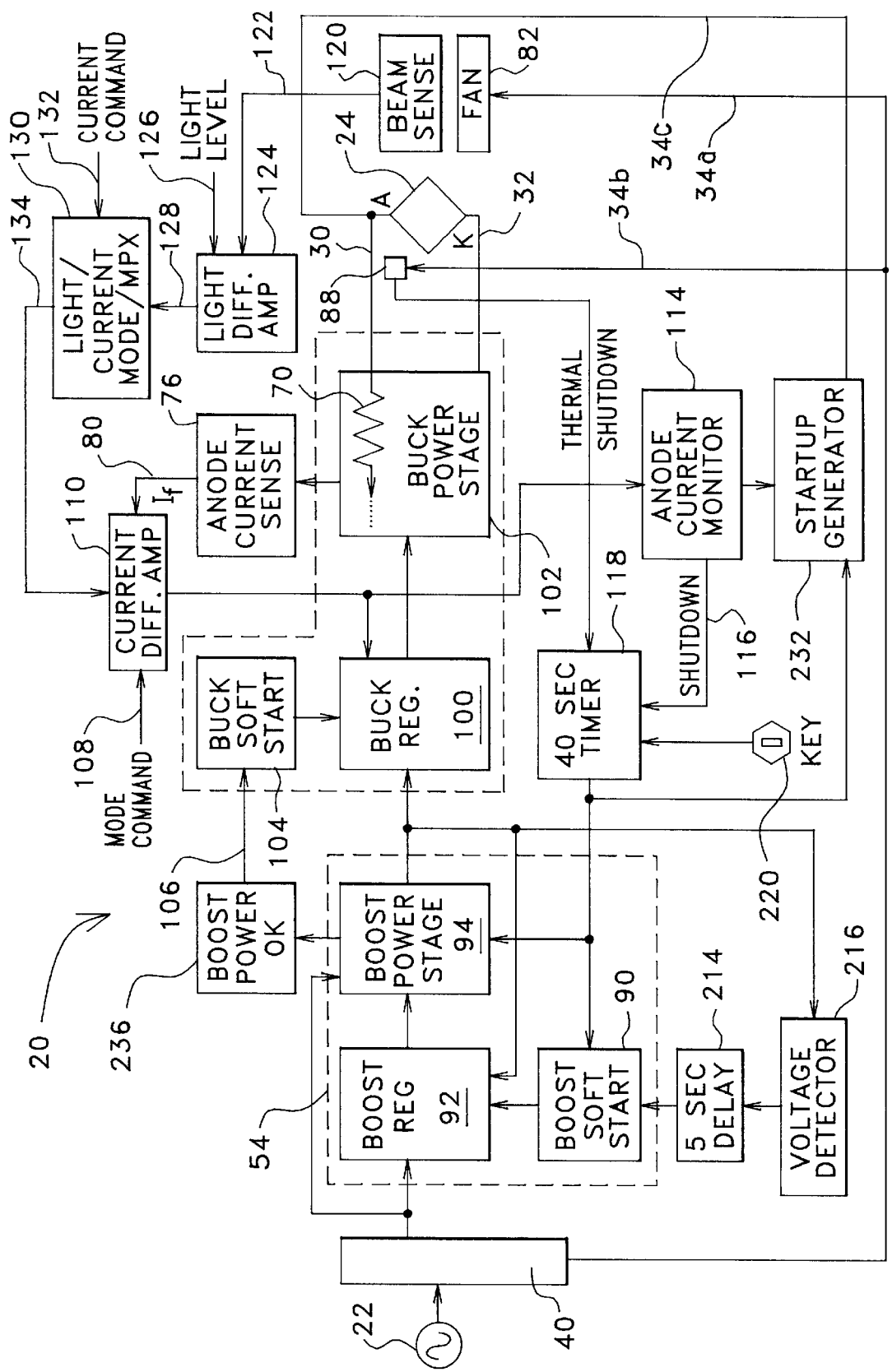
FIG. 3 is block diagram illustrating a gas ion laser system including the laser power controller of the present invention with its various functional blocks.

Attention is now directed to FIG. 3 which is an overall block diagram representation of supply 20. Universal power input section 40, in addition to standard single phase full wave bridge rectifier, includes a passive inductor/capacitor power filter including a standard balun configured common mode filter inductor, protective fuses and an inrush current limiter (none of which has been shown for purposes of clarity) which filters all AC input power. The universal input section also provides AC voltage to a fan 82 on line 34a and thermal interlock voltages on line 34b to a thermal interlock 88 associated with laser tube 24. Filament voltages are provided as shown in FIG. 2. Boost section 54 includes a boost soft start stage 90, a boost regulator 92 and a boost power stage 94. Boost regulator 92 preferably includes a suitable commercially available integrated high power factor pre-regulator (not shown) such as, for example, the Unitrode UC3854. The overall boost regulator section should be configured to provide an output voltage which is at least 5% higher than the maximum contemplated input voltage in order to maintain the required output voltage of 385 VDC, in this instance. Thus, boost regulation is contemplated to be effective over a range of 80 to 270 VAC input voltages. Boost soft start stage 90 is configured for starting boost regulator 92 in a controlled manner upon receipt of an appropriate input signal to be described. It is considered that that the overall configuration of boost section 54 may readily be provided by one of ordinary skill in the art in view of the teachings herein.

Still referring to FIG. 3, buck section 66 receives the 385 VDC generated by boost section 54. Buck section 66 includes a buck regulator 100, a buck power stage 102 which itself includes shunt resistor 70 and a buck soft start stage 104. Upon receipt of a startup signal on line 106, buck soft start section 104 cooperates with the buck regulator in a way which causes buck power stage 102 to gradually produce the predetermined anode to cathode voltage (i.e., 70, 100 or 200 VDC) associated with laser tube 24. Buck regulator 100 includes a suitable commercially available integrated circuit pulse width modulated controller such as, for example, the Unitrode UC 3846 which produces a drive signal for MOSFET 74 (FIG. 2) in response to a feedback signal which is generated in one of two ways to be described immediately hereinafter.

Referring to FIG. 2 in conjunction with FIG. 3, regulation of the output of supply 20 may be accomplished in one of two selectable ways. That is, regulation may be accomplished using either (1) an anode current feedback mode or (2) a light output regulation mode. The mode is selected by providing an input on a mode command line 108 connected with a current difference amplifier 110. In the anode current feedback mode (partially described with reference to FIG. 2), anode current sense amplifier 76 senses the voltage present across shunt resistor 70 to produce feedback current If. One highly advantageous configuration of the anode current sense amplifier will be described at an appropriate point below. If is then received by current difference amplifier 110 and, in response thereto, produces a feedback voltage which is provided to buck regulator section 100. It is noted that current difference amplifier 110 forms one part of control circuit 80 in FIG. 2. Buck section 100 uses the feedback voltage to produce a pulse width modulated drive signal (not shown) which is, in turn, used to drive MOSFET 74 (FIG. 2) located in buck power stage 102. One preferred, highly advantageous configuration of the buck power stage has been described above with reference to FIG. 2. The feedback voltage is also provided to an anode current monitor 114 which compares the anode current during steady state operation with a predetermined maximum and minimum value. If the maximum or minimum value is violated, a shutdown signal is produced on line 116. A forty second timer section 118 receives the shutdown signal and instructs the boost section to cease generation of 385 VDC boost power. Forty second timer 118 serves in monitoring other aspects of system operation and in starting up the system, as will be described in conjunction with a discussion of the operation of supply 20 in accordance with the method of the present invention.

Referring solely to FIG. 3, in the light output regulation mode as selected by the mode command on line 108, the output beam (not shown) of laser tube 24 is sensed by a beam sense unit 120 to produce a proportional signal on line 122 which is provided to a light difference amplifier 124. The latter compares the proportional signal with a reference input 126 to generate a light difference signal on line 128. The light difference signal is then transferred to a light/current mode multiplexer 130. The latter receives a current command on line 132 which selects either the light error signal or the current command signal. Multiplexer 130 then provides a control signal on line 134 to current difference amplifier 110. The current difference amplifier generates a feedback voltage which is used to regulate the light or current output of the laser tube. It should, however, be appreciated that monitoring of the anode current is multiplexed with monitoring of the laser's light output in the light output regulation mode. In this manner, the laser tube continues to be protected from an over current condition. For example, if a malfunction occurs in the light feedback loop which causes the correct light level to be mis-detected as a substantially low light level, the system will attempt to increase light output to bring the light output up to the correct light level. However, if the system is permitted to regulate to the mis-detected light level, the system will, in this instance, overdrive the tube and possibly damage the tube while producing a dangerous level of output light. By continuing to monitor anode current in a multiplexed manner during the light regulation mode, this scenario is avoided. It should be noted that functional blocks described herein such as, for example, those which make up boost regulator 54 are considered as being provideable by one of ordinary skill in the art in view of the present disclosure.

Figure 4:
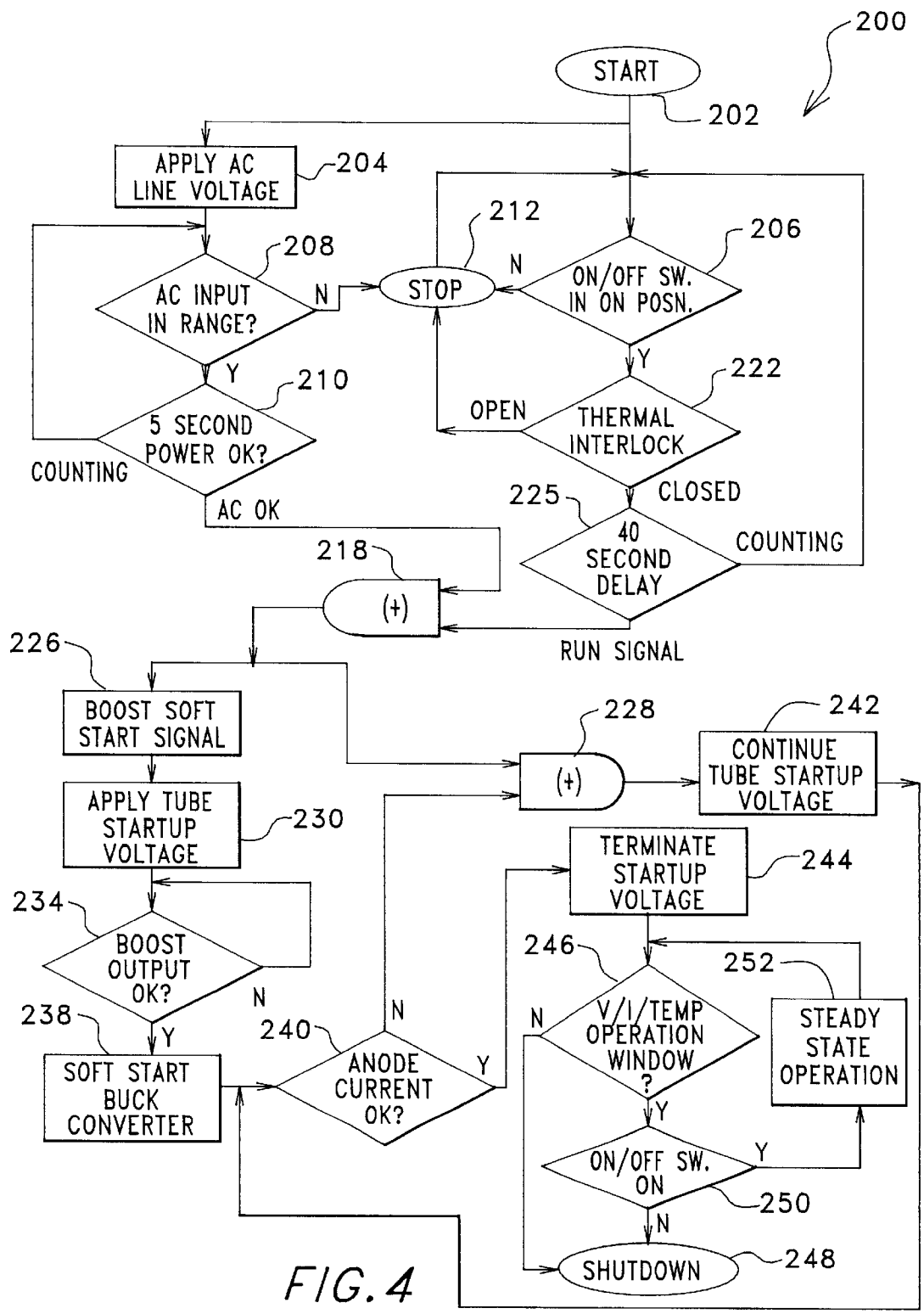
FIG. 4 is a flow diagram illustrating the highly advantageous method of the present invention.

Having generally described the configuration of supply 20, attention is now directed to FIGS. 3 and 4. FIG. 4 illustrates the method of the present invention as generally indicated by the reference number 200. Method 200 begins with start step 202 and proceeds in two separate paths to both steps 204 and 206. In step 204, AC power is applied to supply 20 by input supply 22. In step 208, the voltage provided by AC line source 22 is verified to be greater than 85 VAC. If the voltage is in range, step 210 is next performed. If, however, the voltage is out of range, the method stops at step 212. At step 210, a five second loop is entered in which step 208 is repeatedly performed so as to verify that the AC input remains in range for the duration of a five second period. The five second timer is implemented by five second delay block 214 in FIG. 3 while the AC input voltage test is performed by voltage detector 216 in the same figure. It should be noted that voltage detector 216 appears to monitor the output of boost power stage 94. However, upon initial application of AC power to the supply, the input power (i.e., line voltage) passes through boost power section 54 to voltage detector 216. Upon satisfaction of the five second power test, an "AC OK" signal is "ANDED" at step 218 with a "RUN" signal, the production of which will be described immediately hereinafter.

Still referring to FIGS. 3 and 4, the other path proceeding from step 202 begins with step 206. In step 206, the position of a key switch 220 (FIG. 3) is tested to determine whether it is in its "ON" position. If the keyswitch is "OFF", stop step 212 is entered. If the keyswitch is "ON", a thermal interlock test step 222 is performed. In this step, the state of thermal interlock switch 88 associated with laser tube 24 is checked so as to verify that the tube is not in an overheated condition. If the tube is too hot, the interlock will be open and stop step 212 will be entered. If the tube temperature is normal, the interlock will be closed and a forty second delay step 225 will then be performed. During the forty second delay, steps 206 and 222 are repeatedly looped through to verify the position of the ON/OFF switch and the thermal interlock for the duration of the forty seconds. The forty second delay test is implemented by aforementioned forty second timer 118. Upon satisfaction of the forty second delay, the "RUN" signal is provided to step 218. Assuming that the "AC OK" signal produced by step 210 is also present, system startup begins in earnest with boost soft start step 226 and another "AND" step 228. Boost soft start step 226 initiates a programmed sequential startup of boost regulator 92 which brings up boost power stage 94 to provide its 385 VDC output on line 230. An interval of time of approximately 500 ms is required for boost power stage 84 to fully build up the 385 VDC output. It should be noted that the boost startup sequence does not violate the aforementioned IEC standard of no more than 3% total harmonic distortion at AC supply 22.

Step 230, following immediately after step 226, uses a startup generator 232 (FIG. 2) to apply a startup high voltage of approximately 6 kV to the anode of laser tube 24 on line 34c. Lasing can only begin with the presence of the startup voltage. It should be noted that, in one alternative, step 230 may be initiated prior to step 226 or, in another alternative, these two steps may be initiated concurrently. After step 230, step 234 monitors the boost output voltage using a boost power detector 236 (FIG. 3) to ensure that the output has reached 385 VDC before subsequent steps are executed. In this regard, it is noted that successful turn on of buck section 66 is substantially dependent upon permitting the boost section to build up its output prior to application of a load to the 385 VDC lines. If the load represented by the buck section is applied prior to settling of the boost output, several events are likely to occur. First, the current inrush caused by overlapping startup of both the boost and buck sections is likely to cause an overcurrent condition on AC supply 22 which will quite possibly trip a circuit breaker (not shown) in the input circuit or cause the boost section to shut down. Second, even if the circuit breaker does not trip or prior to its tripping, the high current demand will most likely cause the IEC 3% total harmonic distortion standard to be violated. Thus, the method of the present invention is highly advantageous in eliminating the possibility of either of these events.

Once the boost output power step test of step 234 has been satisfied, step 238 is performed in which a signal to start the buck section is provided on line 106 from the boost power detector to buck soft start section 104. Buck section 66 then begins to operate, applying voltage to the anode of laser tube 24. During buildup of the buck voltage, startup voltage continues to be applied to laser tube 24. In step 240, anode current is monitored using aforedescribed anode current monitor 114. If the anode current is too high or low indicating that steady state operation has not yet been achieved, step 228 is performed in which verification of the continuing presence of the "Run" signal and the "AC OK" signal is verified. Step 242 is then performed, that is, maintaining application of the startup voltage to laser tube 24 using startup generator 232 (FIG. 2). Step 240 is then repeated to retest the level of anode current in the laser tube. If the current is sufficient to maintain steady state laser operation of the laser tube, Step 244 is performed in which startup voltage is terminated. Steady state operation then continues with the performance of step 246. In step 246, various operational parameters are monitored including the status of thermal interlock 88 (FIG. 3), anode to cathode voltage and anode current. The current and voltage parameters are checked against acceptable operational ranges. In the event that one of the parameters is out of its normal range, step 248 is performed, shutting down the system. If all parameter are in range, step 250 is performed in which the state of On/Off switch 220 is tested. If the switch is in its off position, shutdown step 248 is performed. If the On/Off switch is in its on position, steady state operation continues in step 252 with a loop including steps 244, 246 and 250.

Having described the method of the present invention in detail, it should appreciated that certain steps are considered as fundamental within the overall method. Specifically, boost arrangement 54 and application of tube startup voltage are initiated first. As previously mentioned, these two steps may be performed in either order. Irrespective of the chosen order, it is important to then wait for the boost power to build up substantially to its normal operational level. While the wait period is quite short, perhaps on the order of 0.5 seconds, the likelihood of encountering startup problems is significant if startup of the buck section is initiated either at the same time as the boost section or during the "wait" interval. It is submitted that the unreliable startup characteristics of prior art laser power supplies which have been observed by Applicant may be primarily attributable to violation of the "wait" interval. After waiting, startup of the buck arrangement may proceed such that steady state operation of the laser tube ensues. The startup voltage must be removed with detection of steady state operation. If these steps are followed, it has been discovered that tube startup is remarkably reliable and proceeds in a manner which is thought to be as rapid as possible. In this particular regard, it should be mentioned that it is not uncommon for prior art laser power supplies to require 5 minutes or more until steady state operation is achieved. In contrast, supply 20 of the present invention typically achieves steady state operation in no more than 50 seconds including the forty second delay of step 225 or, stated in another way, steady state operation is achieved within 10 seconds of the completion of forty second delay step 225. Moreover, this reliable startup technique avoids violation of the IEC requirements described above and all other standards which are known at the time of this writing.

Turning now to FIG. 5, a preferred embodiment of a current sense amplifier is generally indicated by reference number 76 (also shown in FIG. 2). Previously described shunt resistor 70 is indicated as R70 in anode lead 30. The voltage impressed upon the shunt resistor by the flow of anode current is indicated as V1. Amplifier 76 includes an op amp 302 which is provided power by a 15 volt zener diode Z304 in series with a resistor R306. The + and − inputs of op amp 302 are biased by resistors R308, R310 and R312. Diodes D314 and D316 limit the input between the + and inputs − of the op amp to no more than one diode drop. The output of op amp 302 drives the gates of MOSFET's Q1 and Q2 with the gate of the latter being driven through resistor R318. The MOSFET's are biased using resistors R320 and R322. Negative feedback is provided by capacitor C324, resistor R326 and resistor R328. Capacitor 330 serves to filter switching noise. MOSFET 74, switching diode 68 and inductor 72 from FIG. 2 are also shown along with laser tube 24. An output capacitor C332 provides filtering of the laser tube anode to cathode voltage. Remaining components of sense amplifier 76 will be described, as needed, in conjunction with a description of the operation of the circuit immediately hereinafter.

Still referring to FIG. 5, in operation, anode current sense amplifier 76 uses op amp 302 to sense the voltage on R70 through R308. One end of R70 is connected to the boost output while the other end of R70 is connected with the anode of laser tube 24. As described above, it should be appreciated that the sensed voltage is quite small and is essentially floating somewhere near 385 VDC with respect to primary ground 64. The op amp generates a voltage V2 which is applied to the gates of MOSFET's Q1 and Q2. The MOSFET's, in response to the application of V2, cause V1 to be impressed across R320 and R322. In cooperation with feedback provided by aforementioned components, the MOSFET's generate currents I1 and I2. These currents pass through R334, adding to produce I3. Thereafter, I3 passes through R335 with filtering being provided by capacitor C335. The overall design of sense amplifier 76 implements a mirror current generator with a transfer function of approximately 0.1 milliamp per amp of anode current. That is, if the anode current is equal to 10 amps, I3 will be equal to 1 milliamp. The use of a pair of MOSFET's is advantageous in the present application since there is a need to control power dissipation in each MOSFET. In this regard, the reader is reminded that the MOSFET's are essentially commutating current I3 from 385 VDC to the primary ground reference level. That is, the MOSFET's are subjected to a substantial portion of the 385 VDC, approximately 280 volts, from their drain terminals to their source terminals. Significant power dissipation results with such a voltage drop, even at relatively low levels of current.

Continuing with a description of anode current sense amplifier 76, I3 is provided to a summing junction 340. An anode current scaling signal is also provided on line 342 to summing junction 340. The anode scaling current is generated in a known way, which is proportional to the light or current level command. During steady state operation of the system, the sum of I3 and the anode scaling current is intended to be zero. However, in the event that the sum is not equal to zero, an integrator module 344 which is also connected to summing junction 340 integrates the difference. The integrator module includes an op amp 345 referenced to primary ground 64 and having a negative feedback loop comprising capacitors C346 and C348 and resistor R350. The positive input of op amp 345 is referenced to a stable 6.8 VDC source. Integration of the current difference at summing junction 340 produces a feedback voltage referenced to primary ground 64 on an output line 352. This feedback voltage is then used in buck regulator section 66 by control circuitry 80 (FIG. 2) for the generation of a pulse width modulated signal 356 which, in turn, drives the gate of MOSFET 74. It is noted that conductors 358 and 360 comprise the twisted pair housed by the shield (not shown) of previously described coaxial cable 78 (FIG. 2). Thus, the anode current sense amplifier successfully senses V1 across shunt resistor R70 to produce a proportional mirror current and thereafter produces a feedback voltage referenced to primary ground 64.

Figure 6:
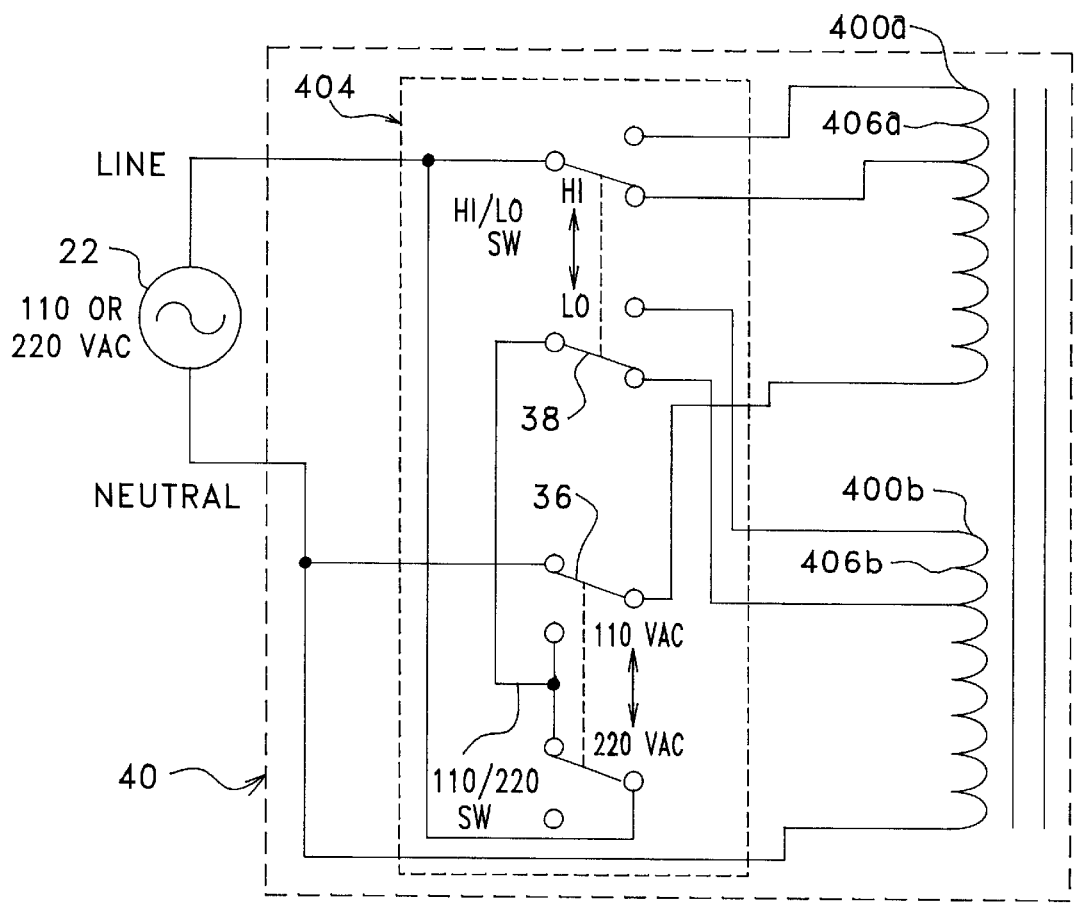
FIG. 6 is a schematic representation of a universal input power arrangement used to power various elements within the overall laser system.

Referring to FIGS. 1, 2 and 6, as previously mentioned, supply 20 includes a universal power input section 40. One portion of the universal input power section is illustrated in FIG. 6. It is noted that AC filtering provisions have not been illustrated for purposes of clarity. FIG. 6 shows primary windings 400a and 400b of a power transformer which couples AC power to a number of secondary windings (not shown) including a filament winding (see FIG. 2), an interlock winding and other windings such as, for example, a +/− 15 volt center tapped winding. Primary windings 400a and 400b are connected with line and neutral leads of AC source 22 by a switch arrangement which includes Hi-Lo switch 38 and input voltage selection switch 36. When source 22 comprises a 110 VAC source, input voltage selection switch 36 is set in the illustrated position. Of course, when source 22 comprises a 220 VAC source, switch 36 is set in its opposite position. Essentially, the circuit utilizes only primary winding 400a in the 110 VAC mode while in the 220 VAC mode, primary windings 400a and 400b are placed in series. Therefore, even though the input voltage is doubled, the transformer turns ratio is effectively reduced by one-half such that the same voltage is induced in the transformer secondary windings irrespective of 110 or 220 VAC input. Hi-Lo switch 38 is utilized as described above. In this embodiment, the Hi-Lo switch bypasses portions 406a and 406b of the primary windings when the Hi-Lo switch is in its Lo position reducing the transformer primary to secondary turns ratio in view of the AC input voltage.

It should be mentioned that the present invention contemplates the use of automated features in supply 20. For example, laser tubes may be provided with specifically configured connectors wherein different connectors are indicative of different anode to cathode voltage requirements associated with a particular tube and, in fact, any other specific requirements associated with that tube. The supply may detect the particular tube's connector and configure its output parameters to match the needs of the tube. Moreover, input voltage source detection may be employed to automate the input voltage selection and Hi-Lo switches, as will be described immediately hereinafter.

Figure 7:
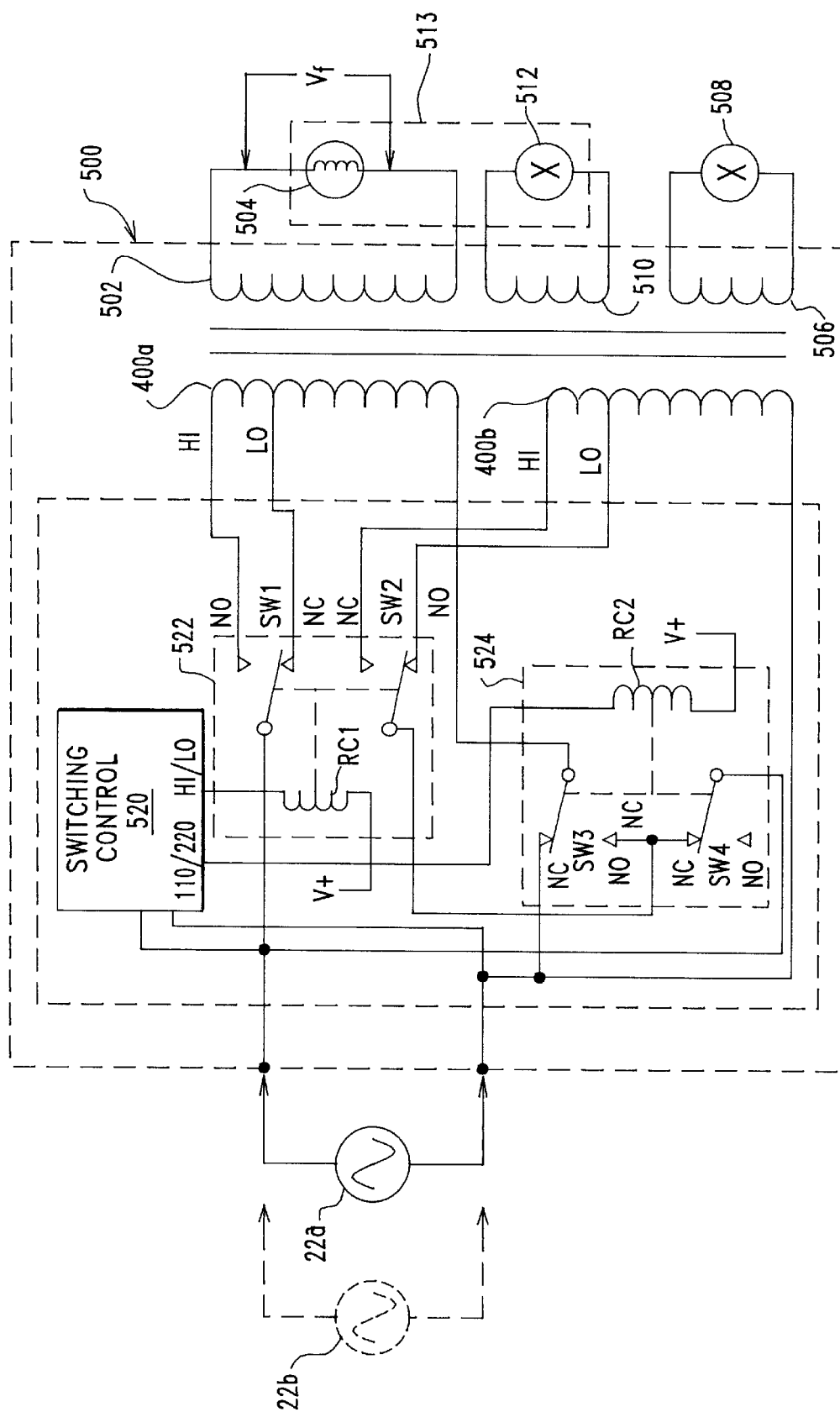
FIG. 7 is a diagrammatic representation of an auto-ranging universal power input section manufactured in accordance with the present invention, shown here to illustrate general details of its construction.

Referring to FIG. 7, supply 20 may be configured as an auto-ranging supply by replacing universal power input section 40 (FIG. 6) with an auto-ranging universal power input section manufactured in accordance with the present invention and generally indicated by the reference number 500. Once again, AC filtering provisions have not been illustrated for purposes of clarity. FIG. 7 shows primary windings 400a and 400b of the filament power transformer which couples AC power to a number of secondary windings including a filament winding 502 connected to filament terminals of a laser tube 504, an internal fan winding 506 connected to an internal fan 508 and an external fan winding 510 connected to an external fan 512. It is noted that the external fan and laser tube 504 are commonly housed in a laser head 513, as will be described in further detail at an appropriate point below. For the moment, it is sufficient to note that not all laser tubes require external fan 512. The present example, however, contemplates laser tube 512 including the external fan. One such laser tube is manufactured by JDS Uniphase Corporation. Other windings such as, for example, a +/− 15 volt center tapped winding is provided as needed, but is not illustrated for purposes of clarity.

Still referring to FIG. 7, auto-ranging universal power input section 500 is connected with line and neutral leads of a first AC utility power source 22a or, alternatively, with a second AC utility power source 22b, shown using dashed lines. Sources 22a and 22b represent the two dominant source voltages provided across the world having intended voltages of 110 volts AC (VAC) and 220 VAC, respectively. Depending upon any number of factors, sources 22a and 22b may vary significantly from their target values over short periods of time. When source 22a is provided, input source voltage may vary over a range of approximately 90–132 VAC. When source 22b is provided, input source voltage may vary over a range of approximately 180–264 VAC. Since a particular laser manufacturer may ship power supplies all over the world, Applicants' experience demonstrates that it is difficult to determine the supplied voltage for utilities around the world in order to properly set up a power supply in advance for any one destination prior to shipment. Moreover, a purchaser who is not the end user may not even be aware at time of purchase of the source voltage at some future end use destination. In this regard, an over voltage situation can occur if the end user mistakenly connects a power supply configured for 110 VAC operation to a 220 VAC source, resulting in significant damage not only to the power supply, but to the laser tube itself. For this reason, the auto-ranging power supply of the present invention is considered to be highly advantageous in automatically detecting and configuring to an available source voltage with which it is connected.

At the same time, in view of the range of possible variation in the magnitude of utility voltage sources from their intended fixed values, the auto-ranging power supply of the present invention advantageously limits variation in the filament voltage to an acceptable range. As mentioned above, excessive filament voltage is known to shorten the lifetime of a laser tube when an AC filament voltage is used. The auto-ranging power supply of the present invention advantageously limits the filament voltage in a way which eliminates shortened tube lifetime resulting from voltage source variations within the aforementioned source voltage ranges, as will be described in further detail.

Continuing with a description of auto-ranging universal power input section 500 of the laser power supply of the present invention, filament primary windings 400a and 400b receive power as controlled by a switching control circuit 520 that cooperates with a HI/LO relay 522 and a primary circuit selection relay 524. Hi/Lo relay 522 includes switches labeled as SW1 and SW2 each of which includes a normally open (NO) and a normally closed (NC) position. Primary circuit selection relay 524 includes switches labeled as SW3 and SW4 each of which also includes a normally open (NO) and a normally closed (NC) position, as indicated. These relays are controlled using relay coils (RC) indicated as RC1 for the HI/LO relay and RC2 for the primary circuit selection relay. The relay coils are connected to appropriate control outputs of switching control circuit 520 that are labeled as HI/LO and 110/220. When SW3 and SW4 of the primary selection relay are in their normally closed positions, as illustrated, the primary circuit is comprised only of primary winding 400a for use with 110 VAC utility source 22a. On the other hand, when SW3 and SW4 of the primary selection relay are in their normally open positions (not shown), the primary circuit is comprised of primary winding 400a in a series connection with primary winding 400b for use with 220 VAC utility source 22b.

The HI/LO relay is operable independently of the primary selection relay such that, when SW1 and SW2 of HI/LO relay 522 are in their normally closed positions, as shown, LO taps of primary windings 400a and 400b are connected in the primary circuit via the primary switching circuit relay. In other words, one or both of the primary windings connected in the primary circuit by the primary switching relay will be connected using LO tap(s), depending on the setting of primary circuit relay 524. If, however, HI/LO relay contacts SW1 and SW2 are in their normally closed positions, one or both of the primary windings will be connected in the primary circuit by means of the HI taps on these windings. As will be seen, appropriate selection of combinations of the states of primary circuit selection relay 524 and HI/LO relay by switching control circuit 522 provides highly advantageous control of an AC filament voltage, $V_f$, produced across the filament of laser tube 504.

Still referring to FIG. 7, having generally described the structure of auto-ranging universal power input section 500, a description of its operation will now be described including its attendant advantages within the overall configuration of the power supply of the present invention. The reader is reminded that auto-ranging universal power input section 500 may be used in place of universal power input section 40 of FIG. 2 insofar as providing an AC filament voltage and other voltages to be described.

TABLE 1

| AUTO-RANGE SELECTED | INPUT LINE VOLTS AC | RELAY SETTINGS 110/220-HI/LO | FILAMENT VOLTAGE (VAC) |
|---|---|---|---|
| 110 LO | 90 | 110-LO | 2.50 |
|  | 95 | 110-LO | 2.65 |
|  | 100 | 110-LO | 2.80 |
|  | 105 | 110-LO | 2.94 |
|  | 108 | 110-LO | 3.02 |

TABLE 1-continued

| AUTO-RANGE SELECTED | INPUT LINE VOLTS AC | RELAY SETTINGS 110/220-HI/LO | FILAMENT VOLTAGE (VAC) |
|---|---|---|---|
| 110 HI | 110 | 110-HI | 2.67 |
|  | 115 | 110-HI | 2.80 |
|  | 120 | 110-HI | 2.98 |
|  | 125 | 110-HI | 3.05 |
|  | 130 | 110-HI | 3.18 |
|  | 132 | 110-HI | 3.23 |
| 220 LO | 180 | 220-LO | 2.53 |
|  | 185 | 220-LO | 2.60 |
|  | 190 | 220-LO | 2.68 |
|  | 195 | 220-LO | 2.75 |
|  | 200 | 220-LO | 2.82 |
|  | 205 | 220-LO | 2.90 |
|  | 210 | 220-LO | 2.97 |
|  | 215 | 220-LO | 3.04 |
|  | 220 | 220-LO | 3.12 |
|  | 225 | 220-LO | 3.19 |
|  | 229 | 220-LO | 3.24 |
| 220 HI | 230 | 220-HI | 2.82 |
|  | 235 | 220-HI | 2.88 |
|  | 240 | 220-HI | 2.95 |
|  | 245 | 220-HI | 3.01 |
|  | 250 | 220-HI | 3.07 |
|  | 255 | 220-HI | 3.14 |
|  | 260 | 220-HI | 3.20 |
|  | 264 | 220-HI | 3.25 |

Referring to Table 1 in conjunction with FIG. 7, auto-ranging universal power input section 500 controls the AC filament voltage, $V_f$, provided to laser tube 504 in a highly advantageous way. Table 1 demonstrates actual measured AC input source (produced using an RMS multimeter) and corresponding AC filament voltage values over the operational range of input source voltages contemplated. The filament voltage was measured at the filament terminals of an argon gas ion laser tube connect to the auto-ranging power supply of the present invention by a 19.5 inch umbilical cable. In Table 1, an "AUTO-RANGE SELECTED" column includes the four possible combinations of states of primary selection circuit relay 524 and HI/LO relay 522. Each of these states corresponds to a predetermined sub-range of input voltage shown in an "INPUT LINE VOLTS AC" column such that a HI and a LO pair of the sub-ranges make up a range of input voltage for each of the 110 and 220 volt AC utility sources. For example, in the instance of 110 VAC source 22a, a 110 LO sub-range extends from 90–108 VAC while a 110 HI sub-range extends from 110–132 VAC. Thus, the overall 110 VAC source voltage range is from 90 VAC to 132 VAC. Similarly, from Table 1, the overall source voltage range for 220 VAC source 22b extends from 180–264 VAC including a LO sub-range from approximately 180–229 VAC and a HI sub-range from approximately 230–264 VAC. It should be appreciated that, for both sources, these are relatively broad ranges that will seldom be violated by utility services since many common electrical appliances such as, for example, televisions and stereos are likely to experience inoperability and/or damage outside of these ranges. Rather than providing mere protection from over voltage conditions, it should be appreciated that the power supply of the present invention provides proper operation over these ranges. Protection against immediate and incapacitating damage is provided over a somewhat broader range just by the AC voltage limiting aspects of the auto-ranging universal power input section. This protection may cooperate with shut down features incorporated within other portions of the laser power supply. In the instance of the need for any increase in the contemplated ranges of input utility sources or completely different input sources having different intended values, appropriate modifications may be made in view of the teachings herein. For example, additional componentry may be added to provide additional sub-ranges and/or completely new ranges of operation.

Continuing to refer to FIG. 7 and Table 1, for purposes of clarity, operation of the auto-ranging AC power supply of the present invention (i.e., including auto-ranging universal power input section 500) will be described in terms of increasing input utility source voltage. In this regard, it is to be understood that switching control section 520 performs continuous monitoring of the input utility source voltage to reconfigure the power supply dynamically to a different AC utility source or to swings in the source voltage of a particular source with which the power supply is connected. Beginning with a 110 VAC source providing only 90 VAC, it is seen in Table 1 that 110/220 VAC relay 524 will be set to the 110 VAC position while HI/LO relay 522 will be set to its LO position, as shown in FIG. 7 and referred to in Table 1 as "110 LO". Stated in another way, switching control section 520 will not cause current to flow through either coil RC1 of relay 522 or coil RC2 of relay 524 such that the contacts in both of the relays are in their normally closed positions. In the 110 LO sub-range, the filament voltage produced for a 90 VAC input is approximately 2.50 VAC. The 110 LO sub-range extends up to a voltage of approximately 108 VAC, corresponding to a filament voltage of approximately 3.02 VAC. In this regard it is noted that the maximum filament voltage of laser tube 504 is approximately 3.25 VAC. Thus, the latter has not been exceeded in the 110 LO range. At the same time, however, the 110 LO sub-range has been "stepped up" such that the maximum filament voltage at the 108 VAC input source voltage is just below the maximum filament voltage. Proper operation of laser tube 504 is provided with a minimum AC filament voltage of approximately 2.5 VAC. Therefore, proper operation of the laser tube is obtained over the entirety of the 110 LO range.

In the 110 HI sub-range of Table 1, the input utility source voltage extends from the intended 110 VAC value up to approximately 132 VAC. In this sub-range, primary selection circuit relay remains in the 110 VAC range with the SW3 and SW4 contacts of the relay in their normally closed positions, as illustrated in FIG. 7. Switching control circuit 520, however, automatically causes coil RC2 of HI/LO relay 522 to be powered so as to move the SW1 and SW2 contacts to their normally open positions. Therefore, the HI tap of primary winding 400a is connected whereby the entirety of primary winding 400a is present in the primary circuit. In the 110 HI sub-range, filament voltage ranges correspondingly from 2.67 VAC up to 3.18 VAC over the sub-range. The filament voltage, accordingly, is limited to a range extending below, but approaching the maximum filament voltage, as desired.

At initial power connection of the supply to utility mains, the system configures for 220 VAC in its HI range for purposes of protecting both the power supply and laser tube, automatic adjustments are then made from this initial configuration. Assuming now that the power supply is connected to 220 VAC source 22b, switching control section 520 is configured to cause coil RC2 of primary circuit selection relay 524 to be powered such that contacts SW3 and SW4 close in their normally open positions (not shown). This results in a series connection of primary coils 400a and 400b in the primary circuit. Throughout the 220 LO sub-range, coil RC1 of the HI/LO relay remains unpowered such that contacts SW1 and SW2 remain in their normally closed positions whereby the series connection of primary windings 400a and 400b is performed through the LO taps of the windings. The line voltage in the 220 LO sub-range begins with a low value of 180 VAC which yields a filament voltage of approximately 2.53 VAC. The highest line voltage in the 220 LO sub-range is 229 VAC yielding a filament voltage of approximately 3.24 VAC, just below the maximum AC filament voltage.

When the line voltage exceeds approximately 229 volts, the 220 HI sub-range is entered. In this sub-range, coils RC1 and RC2 are both automatically caused to be powered by switching control section 520 such that contacts SW1–SW4 are all actuated and close their normally open contacts. Accordingly, both primary windings 400a and 400b are connected in the primary circuit via their HI taps. At the low end of the HI sub-range with an input voltage of 230 VAC, the filament voltage is approximately 2.82 VAC. At the high end of the 220 HI sub-range with a utility input voltage of 264 VAC, the filament voltage is approximately 3.25 VAC, below the maximum AC filament voltage.

Referring to Table 1, comparison of all four of the voltage sub-ranges shows that the upper end of the filament voltage for each does not exceed the maximum filament voltage for the maximum AC utility source voltage of the sub-range. At the same time, the drop in the filament voltage over each of the sub-ranges is sufficiently limited so as to permit acceptable operation of the laser tube even at the lowermost reach of each sub-range. In view of known lifetime operational data using AC filament voltages, lifetime performance guarantees for laser tubes using the auto-ranging power supply of the present invention are more certain to be met when the probability of inadvertently subjecting a laser tube to filament over-voltage is next to eliminated. Furthermore, automatic operation is provided whereby to eliminate the aforementioned concerns with regard to properly configuring power supplies for particular destinations of use. Still a further advantage, relating to laser tube performance, guarantees resides in operational cooling, as will be described immediately hereinafter.

Referring again to FIG. 7, internal and external fans 508 and 512 are operated using secondary windings 506 and 510 of the filament transformer, respectively. It should be appreciated that the auto-ranging features described above are equally effective with regard to range limiting of the AC output voltages of these cooling fan secondary windings. Proper operation of the fans insures dissipation of sufficient, potentially damaging heat away from the laser tube. Unlike the instance of the laser tube filament, in which a maximum filament voltage is critical to tube lifetime degradation, a minimum cooling flow should be provided by the fans. Thus, the lower limit of each fan voltage within each input source voltage sub-range serves to insure sufficient cooling of the laser tube. Empirically, it has been found that, like the AC filament voltage, the fan voltage is confined to a specific AC range. In and by itself, maintaining lower limits of gas ion laser tube air cooling is considered to be highly advantageous. Further benefits may be provided in view of the specific configuration of laser tube 508.

As mentioned briefly above, laser tube 504 includes an external fan which is located within the laser tube itself. Therefore, the external fan is not readily replaceable in the field. Moreover, at least certain laser tubes using an external fan such as, for example, those manufactured by the JDS Uniphase Corporation, include a motor that is designed to operate on a sinusoidal AC power supply. The auto-ranging AC power supply of the present invention, in addition to insuring external fan minimum cooling flow, further provides backward compatibility with presently installed laser tubes configured with such an AC external fan.

Figure 8:
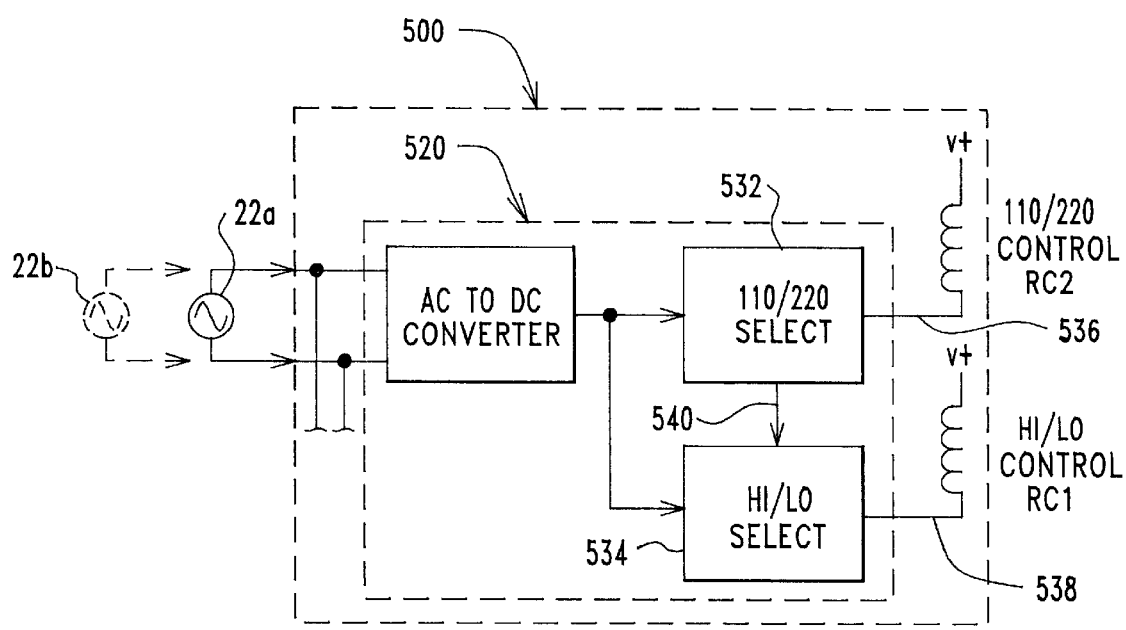
FIG. 8 is a block diagram illustrating a switching control section used in the auto-ranging universal power input section of FIG. 7.

Referring now to FIGS. 7 and 8, operation of the auto-ranging power supply of the present invention will now be described in terms of functions incorporated within switching control section 520. FIG. 7 shows a portion of auto-ranging universal power input section 500 including switching control section 520 that controls relay coils RC1 and RC2 of HI/LO relay 522 and primary circuit selection relay 524, respectively. Switching control section 520 includes an AC to DC converter 530, a 110/220 primary selection control circuit 532 and a HI/LO select circuit 534. One of input utility power sources 22a or 22b is connected to the overall power supply such that the input line voltage is received by AC to DC converter 530. The 110/220 primary selection control circuit generates a control signal on a line 536 which is connected to relay coil RC2. The opposing end of RC2 is connected to a DC voltage supply, indicated as V+, such that a low output on line 536 causes current to flow through RC2 whereby to open the normally closed contacts of relay 524 while closing its normally open contacts. HI/LO select circuit 534 generates a control signal on a line 538 which is connected to relay coil RC1. The opposing end is connected to V+ such that a low output on line 538 causes current to flow through RC1 whereby to open the normally closed contacts of relay 522 while closing its normally open contacts. It is noted that current can be made to flow through the relay coils by grounding one end of each coil and providing a high voltage to the opposing end from switching section 520.

Referring to FIGS. 7 and 8 along with Table 1, AC to DC converter 530 monitors the input AC line voltage to generate a DC voltage responsive to the line voltage which is received by both 110/220 selection circuit 532 and HI/LO select circuit 534. The DC voltage produced by AC to DC converter 530 ranges from 0 VDC to 7 VDC as the AC line voltage ranges from 0 VAC to 264 VAC, respectively. Selection circuit 532 is configured to generate a low drive output on line 536 when the DC voltage received from the AC to DC converter exceeds approximately 3.6 VDC, corresponding to an input utility source line voltage of approximately 136 VAC to connect primary windings 400a and 400b in series in the primary circuit. Below approximately 3.6 VDC, the output of 110/220 selection circuit 532 floats such that the primary circuit is made up of primary winding 400a. Thus, the 110 VAC and 220 VAC ranges shown in Table 1 are implemented by the 110/220 selection circuit.

Considering the operation of HI/LO select circuit 534, the latter receives a voltage source signal on a line 540. The voltage source signal is readily derived from or may comprise the output of the 110/220 selection circuit that is provided to RC2. Using the DC voltage from AC to DC converter 530 and the voltage source signal, HI/LO select circuit 534 controls RC1 consistent with Table 1. Specifically, when line 536 is low, indicating a 220 source voltage, HI/LO select circuit determines (based on the DC input from the AC to DC converter) whether the input AC line voltage is greater or less than approximately 229 VAC. If the AC line voltage is greater than 229 volts AC, the HI/LO select circuit produces a low output on line 538 to cause current to flow through RC1 whereby the HI/LO relay connects primary windings 400a and 400b using their HI taps. On the other hand, if the AC utility line voltage is less than approximately 229 VAC, the HI/LO select circuit allows line 538 to float such that the LO taps of the primary windings are connected. In this way, HI/LO sub-range switching is implemented in the overall 220 VAC power source range from above 136 VAC to at least 264 VAC.

In the overall 110 VAC source input voltage range, indicated to HI/LO select circuit 534 on line 540, for example, by a high state, the HI/LO selection circuit uses the DC input from the AC to DC converter, whether the input AC line voltage is greater or less than approximately 109 VAC, corresponding to an output of approximately 2.9 VDC from AC to DC converter 530. If the AC line voltage is greater than 109 volts AC, the HI/LO select circuit produces a low output on line 538 to cause current to flow through RC1 whereby the HI/LO relay connects primary windings 400a and 400b using their HI taps (note that only primary winding 400a is used in the primary circuit in the 110 VAC source range). Conversely, if the AC utility line voltage is less than approximately 109 VAC, the HI/LO select circuit allows line 538 to float such that the LO taps of the primary windings are connected in the primary circuit. Thus, HI/LO sub-range switching is implemented in the overall 220 VAC power source range from approximately 90 VAC to 132 VAC.

It should be appreciated that circuitry used in the implementation of the present invention may be configured in an unlimited number of ways in view of this overall disclosure. For example, HI/LO relay 522 and primary circuit selection relay 524 may comprise solid state relays or any appropriately configured circuitry. Moreover, each of the functional blocks shown in FIG. 8 may implemented in an unlimited number of ways so long as the requisite functionality is achieved per the foregoing descriptions. In this regard, one embodiment of switching control circuit 520 will be described immediately hereinafter.

Figure 9:
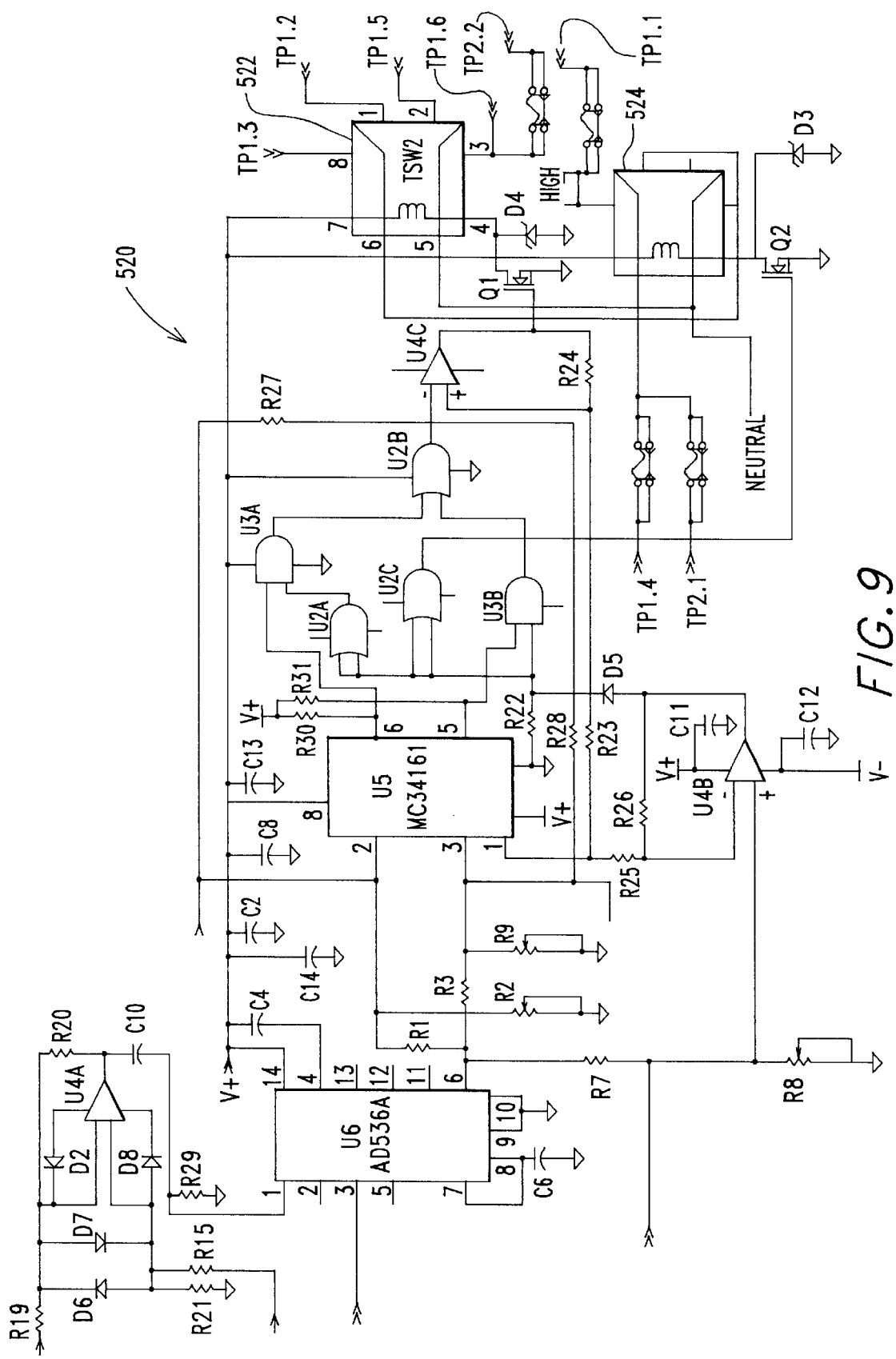
FIG. 9 is a schematic diagram illustrating details of one embodiment of the switching control section of FIG. 8 and its interconnection with other portions of the auto-ranging universal power input section.

Turning to FIG. 9, one embodiment of switching control circuit 520 is illustrated in schematic diagram form. A detailed discussion of all components in the diagram will not be provided since it is considered that one of ordinary skill in the art may readily make the circuit or a modified form thereof in view of the schematic diagram. Relays 522 and 524 are indicated. Potentiometers R2, R8 and R9 provide capability for adjusting the AC line voltage 110/220 as well as the Hi/Lo voltage detector thresholds to account for variations inherent in the AC RMS to DC voltage conversion function that is performed by integrated circuits U4 and U6.

Since the universal laser power controller and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In a power supply for use in a laser system including a gas ion laser tube which requires a filament voltage provided by an output section of the power supply that should not exceed a maximum AC filament voltage specified for the laser tube, said power supply to receive AC power using one of at least first and second AC utility power sources having different first and second intended fixed magnitudes and which may vary in amplitude from the intended fixed magnitudes over corresponding first and second source voltage ranges, respectively, the improvement comprising:

a power control arrangement which automatically controls the output section to generate an auto ranging AC filament voltage from either of the first and second utility sources to be supplied as said filament voltage such that, for each of the first and second AC utility power sources, the auto ranging AC filament voltage is limited to a regulated range extending below, but not exceeding the maximum AC filament voltage when the first and second voltages are within the first and second source voltage ranges, irrespective of which of the first or second AC utility power sources to which the power supply is connected.

2. The improvement of claim 1 wherein said laser tube is cooled by at least one fan and wherein said output section is configured to generate at least one AC fan voltage from either of the first and second utility sources to be supplied to the fan such that, for each of the first and second AC utility power sources, the AC fan voltage is responsive to said automatic control in a way which limits the fan voltage to a fan voltage range which establishes a minimum cooling flow when the first and second voltages are within the first and second source voltage ranges.

3. The improvement of claim 1 wherein said power control arrangement includes a sensing arrangement which senses a line voltage of a particular AC utility power source with which the power supply is connected to produce a sensed voltage and, thereafter, uses the sensed voltage in configuring the output section to the utility with which the power supply is connected.

4. The improvement of claim 3 wherein the output section includes a filament transformer having a tube secondary winding connected to the laser tube across which said filament voltage is produced and a primary circuit including an arrangement of at least two primary windings that are electrically connectable in the primary circuit such that the primary circuit may be made up of at least a portion of a selected one of the primary windings as a first configuration or made up of at least portions of the two primary windings in a series connection as a second configuration and wherein the power control arrangement includes a switching section for automatically connecting the primary windings in the primary circuit in the first or second configurations responsive to the sensed voltage.

5. The improvement of claim 3 wherein the first intended fixed magnitude of the first AC utility power source is approximately 110 volts AC and the second intended fixed magnitude of the second AC utility power source is approximately 220 volts AC and wherein said sensing arrangement is configured for using the sensed voltage to generate a control signal indicative of whether the power supply is connected to the 110 or 220 volt AC source and said switching arrangement is configured to connect the primary circuit in the first configuration when the 110 volt AC source is detected and to connect the primary circuit in the second configuration when the power supply is connected to the 220 volt AC source based on the control signal.

6. The improvement of claim 4 wherein each of the primary windings includes at least a high and a low tap and wherein the switching circuit includes a tap selection circuit configured for connecting the primary windings in the first and second configurations using the high and low taps by establishing a high/low switching point within each of the first and second source voltage ranges and connecting the primary windings using the low taps when the sensed voltage is less than the high/low switching point while connecting the primary windings using the high taps when the sensed voltage is greater than the high/low switching point.

7. The improvement of claim 5 wherein the high/low switching point is set to approximately 109 volts AC in the first source voltage range and approximately 229 volts AC in the second source voltage range.

8. In a power supply for use in a laser system including a gas ion laser tube which requires a filament voltage provided by an output section of the power supply, the value of which filament voltage determines a known lifetime of useful operation associated with the laser tube when the filament voltage is provided as an AC voltage, said power supply to receive power using one of at least two possible AC utility power sources having different intended fixed magnitudes, but each of which varies from the intended fixed magnitudes, the improvement comprising:

a power control arrangement which automatically generates a regulated AC filament voltage from either of the two possible utility sources to supply said filament voltage using the output section and which filament voltage is provided to the laser tube in a way which manages an operating lifetime of the laser tube in view of said known lifetime when the laser tube is operated using AC filament voltage produced from either of the utility sources.

9. The improvement of claim 8 wherein the filament voltage provided to the laser tube should not exceed a maximum filament voltage and each of said AC utility power sources may vary over a predetermined voltage range above and below the intended fixed magnitudes and wherein said power control arrangement is configured so as to automatically limit the AC filament voltage to a filament operating range extending below, but not exceeding the maximum filament voltage, irrespective of which of the two possible AC utility power sources with which the power supply is connected.

10. A power supply for use in a laser system including a gas ion laser tube which requires a filament voltage provided at filament terminals that should not exceed a maximum AC filament voltage specified for the laser tube, said power supply to receive AC power using one of at least first and second AC utility power sources having different first and second intended fixed magnitudes and which may vary in amplitude from the intended fixed magnitudes over corresponding first and second source voltage ranges, respectively, said power supply comprising:

an output section connected to an available one of the first and second AC utility power sources and further connected to the filament terminals of the laser tube; and a power control arrangement which automatically controls the output section to generate an auto ranging AC filament voltage at the filament terminals from the available one of the first and second utility sources such that, for each of the first and second AC utility power sources, the auto ranging AC filament voltage is limited to a regulated range extending below, but not exceeding the maximum AC filament voltage when the first and second voltages are within the first and second source voltage ranges, irrespective of which of the first or second AC utility power sources to which the power supply is connected.

11. The power supply of claim 10 wherein said laser tube is cooled by at least one fan and wherein said output section is configured to generate an auto ranging AC fan voltage from either of the first and second utility sources to be supplied to the fan such that, for each of the first and second AC utility power sources, the auto ranging fan voltage is limited to a fan voltage range which establishes a minimum cooling flow when the first and second voltages are within the first and second source voltage ranges.

12. The power supply of claim 10 wherein said power control arrangement includes a sensing arrangement that senses a line voltage of a particular AC utility power source with which the power supply is connected to produce a sensed voltage and, thereafter, uses the sensed voltage in configuring the output section to the particular AC utility power source.

13. The power supply of claim 12 wherein the output section includes a filament transformer having a tube secondary winding connected to the filament terminals of the laser tube across which said filament voltage is produced and a primary circuit including an arrangement of at least two primary windings that are electrically connectable in the primary circuit such that the primary circuit may be made up of at least a portion of a selected one of the primary windings as a first configuration or made up of at least portions of the two primary windings in a series connection as a second configuration and wherein the power control arrangement includes a switching section for automatically connecting the primary windings in the primary circuit in the first or second configurations responsive to the sensed voltage.

14. The power supply of claim 13 wherein the first intended fixed magnitude of the first AC utility power source is approximately 110 volts AC and the second intended fixed magnitude of the second AC utility power source is approximately 220 volts AC and wherein said sensing arrangement is configured for using the sensed voltage to generate a control signal indicative of whether the power supply is connected to the 110 or 220 volt AC source and said switching arrangement is configured to connect the primary circuit in the first configuration when the 110 volt AC source is detected and to connect the primary circuit in the second configuration when the power supply is connected to the 220 volt AC source based on the control signal.

15. The power supply of claim 13 wherein each of the primary windings includes at least a high and a low tap and wherein the switching circuit includes a tap selection circuit configured for connecting the primary windings in the first and second configurations using the high and low taps by establishing a high/low switching point within each of the first and second source voltage ranges and connecting the primary windings using the low taps when the sensed voltage is less than the high/low switching point while connecting the primary windings using the high taps when the sensed voltage is greater than the high/low switching point.

16. The power supply of claim 15 wherein the high/low switching point is set to approximately 109 volts AC in the first source voltage range and approximately 229 volts AC in the second source voltage range.

17. The power supply of claim 13 wherein said laser tube is cooled by at least one fan designed to accept AC power and wherein said output section is configured to generate an auto ranging AC fan voltage from either of the first and second utility sources to be supplied to the fan from a fan secondary winding which forms part of said filament transformer such that, for each of the first and second AC utility power sources, the auto ranging fan voltage is limited to a fan voltage range which establishes a minimum cooling flow when the first and second voltages are within the first and second source voltage ranges.

18. A method for operating a power supply for use in a laser system including a gas ion laser tube which requires a filament voltage provided at filament terminals that should not exceed a maximum AC filament voltage specified for the laser tube, said power supply to receive AC power using one of at least first and second AC utility power sources having different first and second intended fixed magnitudes and which may vary in amplitude from the intended fixed magnitudes over corresponding first and second source voltage ranges, respectively, said method comprising the steps of:
connecting an output section to an available one of the first and second AC utility power sources and further connecting the output section to the filament terminals of the laser tube; and
automatically controlling the output section to generate an auto ranging AC filament voltage at the filament terminals from the available one of the first and second utility sources such that, for each of the first and second AC utility power sources, the auto ranging AC filament voltage is limited to a regulated range extending below, but not exceeding the maximum AC filament voltage when the first and second voltages are within the first and second source voltage ranges, irrespective of which of the first or second AC utility power sources to which the power supply is connected.

19. The method of claim 18 wherein said laser tube is cooled by at least one fan and said method further includes the step of configuring the output section to generate an AC fan voltage from either of the first and second utility sources to be supplied to the fan such that, for each of the first and second AC utility power sources, the fan voltage is responsive to said automatic control in a way which limits the fan voltage to a fan voltage range that establishes a minimum cooling flow when the first and second voltages are within the first and second source voltage ranges.

20. The method of claim 18 wherein said automatic control step includes the step of sensing a line voltage of the available AC utility power source with which the power supply is connected to produce a sensed voltage and, thereafter, using the sensed voltage in configuring the output section to the particular AC utility power source.

21. The method of claim 20 wherein the output section includes a filament transformer having a tube secondary winding connected to the filament terminals of the laser tube across which said filament voltage is produced and a primary circuit including an arrangement of at least two primary windings that are electrically connectable in the primary circuit such that the primary circuit may be made up of at least a portion of a selected one of the primary windings as a first configuration or made up of at least portions of the two primary windings in a series connection as a second configuration and wherein the output section is configured to the available AC utility power source in a switching step that selectively connects the primary windings so as to define the first or second configurations dynamically responsive to the sensed voltage.

22. The method of claim 21 wherein each of the primary windings includes at least a high and a low tap and wherein the switching step includes the step of connecting the primary windings in the first and second configurations using the high and low taps by establishing a high/low switching point within each of the first and second source voltage ranges and, thereafter, connecting the primary windings using the low taps when the sensed voltage is less than the high/low switching point while connecting the primary windings using the high taps when the sensed voltage is greater than the high/low switching point.

23. The method of claim 22 wherein the high/low switching point is set to approximately 109 volts AC in the first source voltage range and approximately 229 volts AC in the second source voltage range.

24. The power supply of claim 22 wherein said laser tube is air cooled by at least one fan designed to accept AC power and wherein said output section is configured to generate an AC fan voltage from either of the first and second utility sources to be supplied to the fan from a fan secondary winding which forms part of said filament transformer such that, for each of the first and second AC utility power sources, the fan voltage is responsive to said automatic control in a way which limits the fan voltage to a fan voltage range which establishes a minimum cooling flow when the first and second voltages are within the first and second source voltage ranges.

25. A multi-mode power controller for use in a laser system which may include one of at least two different laser tubes to be driven by different particular sets of drive voltages using an input utility voltage, said power controller comprising:

a first arrangement for selecting between first and second modes of operation of the power controller depending on and corresponding to which specific one of said two different laser tubes the power controller is intended to drive; and a power conversion arrangement which is responsive to the particular mode selected by said first arrangement such that the power conversion arrangement uses the input utility voltage to produce the particular set of drive voltages to be used to drive the specifically selected laser tube.

26. The power controller of claim 25 wherein said input utility voltage may include an actual AC voltage which is above or below an intended AC voltage and said particular sets of drive voltages include certain voltages which are intended to be fixed in value from one set of drive voltages to the next, but which drive voltages vary based upon the actual AC voltage provided and wherein said power conversion arrangement is configured for adjusting the value of said certain voltages towards said intended fixed values based upon the actual AC voltage provided.

27. The power controller of claim 25 wherein said power conversion arrangement is configured to provide particular sets of drive voltages to drive laser tubes having anode to cathode voltages in the range of approximately 70 volts DC to at least 200 volts DC.

28. The power controller of claim 27 wherein said power conversion arrangement is configured to drive a laser tube having an anode to cathode voltage of either 70 VDC, 100 VDC or 200 VDC.

29. The power controller of claim 25 wherein said power conversion arrangement is configured for applying the set of drive voltages to the specific laser tube being driven in a way which induces less than 3% total harmonic distortion on the input utility voltage.

30. In a power controller for use in a laser system which may include one of at least two different laser tubes to be operated by different particular sets of drive voltages using an input utility voltage, a method comprising the steps of:

configuring a first arrangement forming a portion of the power controller for selecting between first and second modes of operation of the power controller depending on and corresponding to which specific one of said two different laser tubes the power controller is intended to operate; and responsive to the selection between the first and second modes of operation, driving a power conversion arrangement such that the power conversion arrangement uses the input utility voltage to produce the particular set of drive voltages to be used to operate the specifically selected laser tube.

31. The method of claim 30 wherein said power conversion arrangement drives the specifically selected laser tube in a way which induces less than 3% total harmonic distortion on the AC input being used.

32. The method of claim 30 including the step of using the first arrangement for selecting either approximately 110 volts AC as said input voltage or 220 volts AC as said input utility voltage.

33. The method of claim 32 wherein each AC input voltage may include an actual AC voltage which is above or below an intended AC voltage and said particular sets of drive voltages include certain voltages which are intended to be fixed in value from one set of drive voltages to the next, but which drive voltages vary based upon the actual AC voltage provided and including the step of adjusting the value of said certain voltages towards said intended fixed values based upon the actual AC voltage provided.

* * * * *